May 5, 1964
J. M. CONSTABLE
3,132,309
BATTERY OPERATED POWER SUPPLY
Filed Oct. 31, 1958
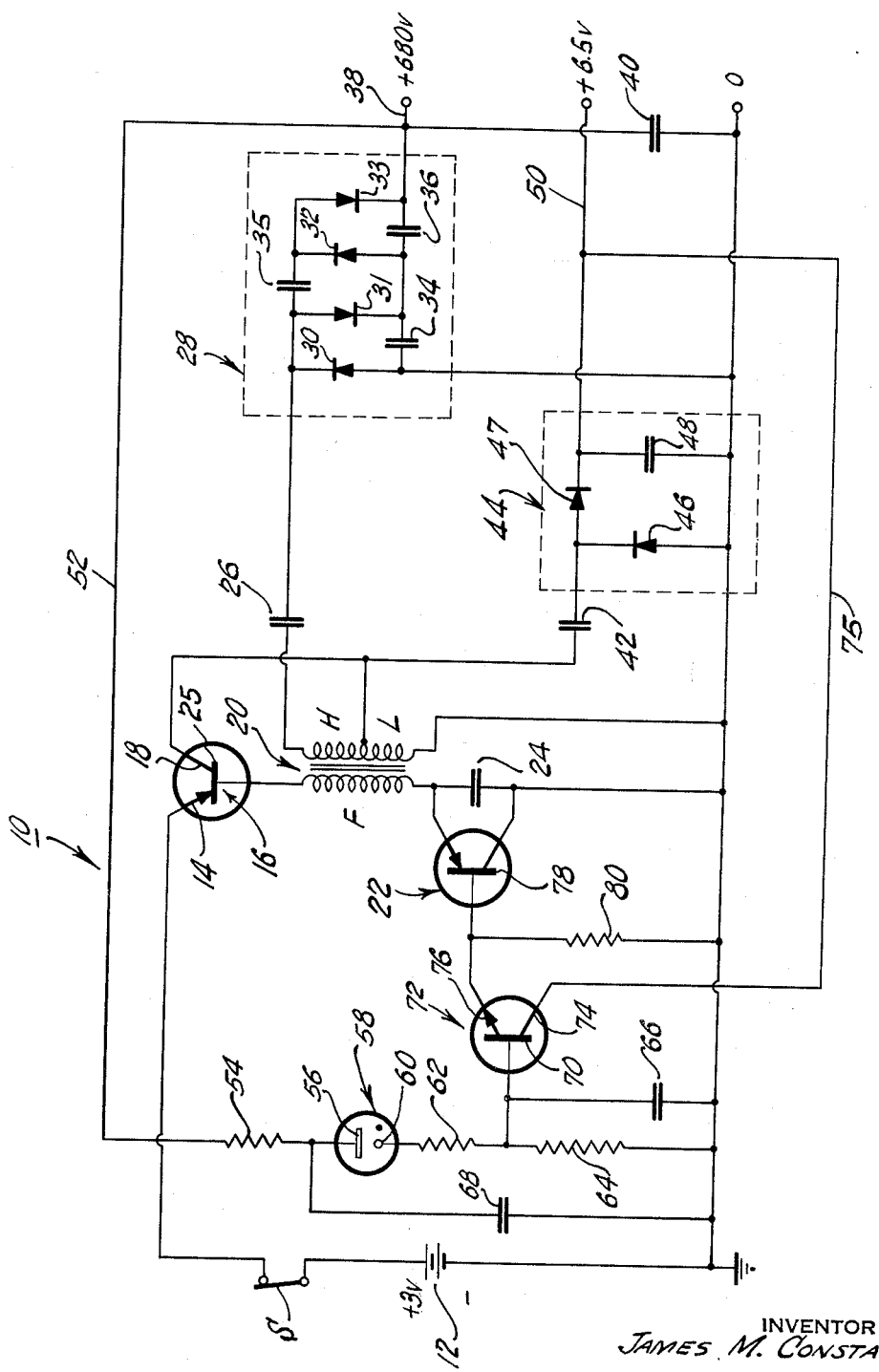
INVENTOR
JAMES M. CONSTABLE
BY
Curtis, Morris & Safford
ATTORNEYS

United States Patent Office 3,132,309
Patented May 5, 1964

3,132,309
BATTERY OPERATED POWER SUPPLY
James M. Constable, White Plains, N.Y., assignor to Electronic Products Company, Mount Vernon, N.Y.
Filed Oct. 31, 1958, Ser. No. 771,164
4 Claims. (Cl. 321—2)

This invention relates to a direct voltage power supply, and more particularly to such a supply which operates from low voltage batteries, such as flash-light batteries, to produce a constant output voltage of many hundreds of volts, for example.

An object of this invention is to provide a battery-powered high voltage supply having improved efficiency and reliability, and which operates to give a substantially constant output voltage even though the supply batteries progressively give less and less voltage as they approach exhaustion.

Another object is to provide such a supply which is simple, rugged and reliable so that it is well suited for use in portable, lightweight equipment.

Still another object is to provide a power supply of this kind which can be manufactured at low cost.

These and other objects will in part be understood from and in part pointed out in the description given hereinafter.

In order to convert a low battery voltage, for example three volts, into a direct voltage of many hundreds of volts it has been the practice to apply by means of a rapidly operated reversing switch, or vibrator, the low battery voltage to the primary of a transformer and than to rectify a high voltage obtained from the transformer secondary.

A vibrator arrangement of this kind however has several serious drawbacks which unfortunately cannot be avoided. Among these are the possibility of mechanical failure of the vibrator and its relatively low power-converting efficiency, which for example may be only about 20% or so. The present invention provides a power supply with no mechanically moving parts, which not only has greatly improved reliability and efficiency (upwards of 80%) but which provides an output voltage effectively independent of battery supply voltage substantially until the battery is exhausted.

In accordance with the present invention, a transistor is connected in circuit with a transformer as a blocking oscillator and powered from a low voltage battery. The oscillating currents from the battery into the transformer generate across a secondary winding, a high voltage which is then rectified to obtain a direct output voltage. This voltage is closely regulated in value by controlling the bias of the oscillator transistor. If the output voltage begins to drop, more current is permitted to pass through this transistor which immediately causes the output voltage to rise. Conversely if the output voltage rises, the current to the oscillator transistor is decreased. The output voltage is determined and held constant by reference to the breakdown voltage of a gas discharge regulating tube which is interconnected by other transistors to the blocking oscillator transistor to control the amount of current passing through it. The size of this power supply is very small, being only a cubic inch or so, and because of its small size and the fact that it can be encapsulated, it is virtually unaffected by mechanical shocks, vibration, changes in temperature and humidity.

A better understanding of the invention together with fuller appreciation of its many advantages will best be gained from the following description given in conection with the accompanying drawing which shows a power supply circuit embodying features of the invention. The voltage supply circuit 10 seen in the drawing is supplied at the left with current from a low voltage battery 12 such as a flashlight battery, whose output voltage may decrease with use until it is exhausted. The negative side of this battery is grounded and its positive side is connected through a switch S to the emitter 14 of an oscillator transistor 16. The latter, as will be explained operates as a blocking oscillator and serves to interrupt the direct current from battery 12 in the process of generating a much higher output direct voltage. The collector 18 of this transistor is connected to ground through a low voltage winding L of a blocking-oscillator transformer 20.

When the circuit is first turned on by closing switch S, a surge of current flows through the emitter and collector of transistor 16 into winding L of transformer 20. The current flowing in winding L in turn induces a voltage in a feedback winding F of the transformer. The lower end of this winding F is conductively connected to ground through the emitter-collector electrodes of a transistor 22 which, as will be explained, serves as a variable resistor. The lower end of winding F is shunted to ground for alternating current by a capacitor 24; the upper end of this winding is directly connected to the base 25 of transistor 16. The feedback voltage induced in winding F by current in winding L is applied in proper phase to cause still greater current flow into winding L. When the current reaches a given maximum value, the voltage induced across feedback winding F then begins to decrease and this quickly turns off all current through transistor 16 and into winding L. Thereafter, the current again builds up and is turned off, and so on at a rapid rate. The amplitude of this current, by means of which the magnitude of the output voltage is regulated, is controlled, as will be explained, by controlling the series resistance of transistor 22.

Connected in series with low voltage winding L, and wound on the same core, is a high voltage winding H. The current passing through winding L from oscillator transistor 16 generates an alternating voltage of considerable magnitude (of the order of one to two hundred volts) across winding H. This alternating voltage is applied through a capacitor 26 to a conventional voltage multiplier-rectifier arrangement, generally indicated at 28, which comprises four rectifiers 30, 31, 32, and 33, and the capacitors 34, 35, and 36 connected as shown. A very high direct output voltage (for example, 680 volts) is obtained at the output lead 38. To minimize fluctuation and ripple in this voltage, lead 38 is bypassed to ground by a filter capacitor 40.

To obtain a second direct output voltage of much lower magnitude (for example 6.5 volts) the alternating voltage across low voltage winding L is applied through a capacitor 42 to a rectifier arrangement generally indicated at 44. This arrangement, as with arrangement 28, is conventional and comprises the rectifiers 46 and 47 and a filter capacitor 48. The output of this rectifier arrangement is applied to a lead 50.

As was mentioned, the output voltage on lead 38, and also on lead 50, is regulated so that it remains substantially constant. To this end the voltage on output lead 38 is applied through a lead 52 and an isolating resistor 54 to the anode 56 of a gas discharge voltage regulating tube 58. The cathode 60 of this tube is connected to ground through an isolating resistor 62 and a load resistor 64. To minimize voltage fluctuations across load resistor 64 it is shunted by a filter capacitor 66 and the anode of tube 58 is bypassed to ground by a filter capacitor 68.

If the output voltage on lead 38 rises slightly, the voltage across load resistor 64 will also rise slightly, and vice versa. Now, this load resistor is also connected between ground and the base 70 of an amplifier transistor 72 so that any change in voltage across resistor 64 causes a corresponding change in the current flowing between the collector 74 and the emitter 76 of this transistor. A part of this current, which current flows into collector 74 through lead 75 from the low voltage output lead 50, in turn flows into the base 78 of transistor 22 and a part into a load resistor 80. The amount of current into the base of transistor 22 determines its emitter-to-collector resistance and in turn controls the magnitude of the output voltage on lead 38. The current applied to base 78 of transistor 22, which is of PNP type, from transistor 72, of NPN type, is in proper phase to oppose any change in the output voltage on lead 38. Thus, this output voltage is closely regulated to a value determined by the glow voltage of regulator tube 58. The low output voltage at lead 50 is similarly held constant.

The current drawn by regulator tube 58 is very small, a small fraction of a milliampere, and hence the overall efficiency of the circuit in converting the possibly changing voltage of battery 12 into a closely regulated high output voltage is excellent. This makes the circuit especially useful for battery-operated, very compact portable equipment.

The above description is intended in illustration and not in limitation of the invention. Various changes in the embodiment described may occur to those skilled in the art and these can be made without departing from the spirit or scope of the invention as set forth.

I claim:

1. A constant voltage power supply which is adapted to operate efficiently from low voltage batteries whose output voltage may progressively decrease as they are used up, said supply comprising a first transistor having two output electrodes and a control electrode, a transformer having a first winding, said winding in series with the output electrodes of said first transistor being adapted to be connected across a low voltage battery, a high voltage winding on said transformer, rectifier means connected to said high voltage winding to produce a direct output voltage, a gas discharge voltage regulating tube connected in series with a large value load resistor across said direct output voltage and normally conducting when said output voltage is at operating value, a second transistor having an input and an output, the input thereof being connected to at least a portion of said load resistor, a third transistor having an output coupled to the control electrode of said first transistor and having an input connected to the output of said second transistor, and oscillating signal feedback means coupled to said first transistor in series with the output of said third transistor and the control electrode of said first transistor to rapidly interrupt the flow of current between said two output electrodes and to variably bias said first transistor, whereby a high direct voltage is generated from said low battery voltage and even though said battery voltage decreases with use, said output voltage is maintained susbtantially constant.

2. The power supply as in claim 1 wherein said first and third transistors are of the same type PNP or NPN and said second transistor is of the opposite type.

3. The power supply as in claim 1 in further combination with second rectifier means connected to said first winding to produce a low output voltage, said second transistor being energized from said low output voltage.

4. A regulated high voltage power supply which is adapted to operate efficiently from a low voltage input, said supply comprising a first transistor having two output electrodes and a control electrode, a transformer having a first output winding, said winding in series with the output electrodes of said first transistor being adapted to be connected across a low voltage source, a high voltage winding on said transformer, rectifier means connected to said high voltage winding to produce a direct output voltage, a gas discharge voltage regulating tube connected in series with a large value load resistor and normally conducting when said output voltage is at operating value, a feedback winding on said transformer, a control transistor having an output connected in series with said feedback winding to the control electrode of said first transistor, and means connecting the input of said control transistor to a least a portion of said load resistor to variably bias said first transistor so that small variations in said output voltage are counteracted and said output voltage is maintained substantially constant.

References Cited in the file of this patent
UNITED STATES PATENTS

| | | |
|---|---|---|
| 2,791,739 | Light | May 7, 1957 |
| 2,854,615 | Light | Sept. 30, 1958 |
| 2,898,557 | Dahlin | Aug. 4, 1959 |
| 2,944,191 | Kopteyn | July 5, 1960 |
| 2,946,924 | Gerlach et al. | July 26, 1960 |